US005302825A

United States Patent [19]

Abumehdi et al.

[11] Patent Number: 5,302,825

[45] Date of Patent: Apr. 12, 1994

[54] FRANKING MACHINE AND METHOD OF FORMING FRANKING IMPRESSION

[75] Inventors: Cyrus Abumehdi, Harlow; Dennis T. Gilham, Brentwood; Raymond J. Herbert, Leigh-on-Sea; Rodney F. Jude, Brentwood, all of United Kingdom

[73] Assignee: Alcatel Business Systems Limited, Essex, United Kingdom

[21] Appl. No.: 774,320

[22] Filed: Oct. 10, 1991

[30] Foreign Application Priority Data

Oct. 11, 1990 [GB] United Kingdom ................. 9022080

[51] Int. Cl.[5] ............................................... G06K 7/12

[52] U.S. Cl. ..................................... 250/271; 283/73; 283/85

[58] Field of Search ...................... 250/271; 283/73, 85

[56] References Cited

U.S. PATENT DOCUMENTS 4,007,462 2/1977 Wetsel, Jr. ........................... 283/85

FOREIGN PATENT DOCUMENTS 0260129 3/1988 European Pat. Off. .
0305211 3/1989 European Pat. Off. .
0343915 11/1989 European Pat. Off. .
1230151 4/1971 United Kingdom .
2097330 11/1982 United Kingdom .
2183856 6/1987 United Kingdom .
2190210 11/1987 United Kingdom .
2197500 5/1988 United Kingdom .

*Primary Examiner*—Jack I. Berman
*Attorney, Agent, or Firm*—Shoemaker and Mattare Ltd.

[57] ABSTRACT

A method of forming a franking impression on a mail item and apparatus for forming the franking impression is disclosed. Material which is switchable from one stable state to another stable state by exposure to light of predetermined wavelength is deposited on the mail item while in one state and a selected region of the deposited material is exposed to light of the predetermined wavelength to effect switching of the selected region to the other state and thereby to represent franking or other secure information.

29 Claims, 4 Drawing Sheets

FRANKING MACHINE AND METHOD OF FORMING FRANKING IMPRESSION

BACKGROUND OF THE INVENTION

This invention relates to franking machines and in particular to methods and apparatus for forming a franking impression on mail items.

SUMMARIES OF THE INVENTION

According to one aspect of the invention a franking machine includes means to deposit an area of material on a face of a mail item, said material being switchable from a first optically stable state to a second optically stable state by exposure to light of predetermined wavelength and said deposited material being in said first state; and selectively operable first exposure means to expose at least one selected region of the area of material in said first state to light of said first predetermined wavelength to switch the selected region or regions to the second state to represent information.

According to another aspect of the invention a method of forming a franking impression on a mail item comprises the steps of depositing an area of material on a face of a mail item, said material being switchable from a first stable optical state to a second stable optical state by exposure to light of predetermined wavelength and said deposited material being in said first state; and selectively exposing at least one selected region of the area of material in said first state to light of first predetermined wavelength to switch the selected region or regions to the second state to represent information.

BRIEF DESCRIPTION OF THE DRAWING

Embodiments of the invention will now be described by way of example with reference to the drawings in which.

DESCRIPTION OF THE PREFERRED EMBODIMENT

A franking machine embodying the present invention makes use, in printing franking impressions on mail items, of ink consisting of or containing an optically sensitive material having first and second stable visual states. The optically sensitive material can be switched from its first state to its second state by exposure to light of a first wavelength and can be switched from its second state to its first state by exposure to light of a second wavelength different from the first wavelength. Switching of the material occurs provided the light has wavelengths within predetermined first and second ranges and is of sufficient intensity. The material is relatively insensitive to normal ambient light and although its state may be partially changed by exposure to ambient light the material is not fully switched from one state to the other state by normal ambient light. Materials with these properties have been developed and are produced by Traqmark Systems Limited. These materials have photochromic properties and are of different colour in the two stable states. An example of the optically sensitive material is relatively invisible when in its first state but changes to a red colour when switched to its second state. Switching of the material from the first to the second state is effected by exposure to light in the ultra violet region of the spectrum and switching from the second state to the first state is effected by exposure to light in the yellow region of the spectrum.

Figure 1:
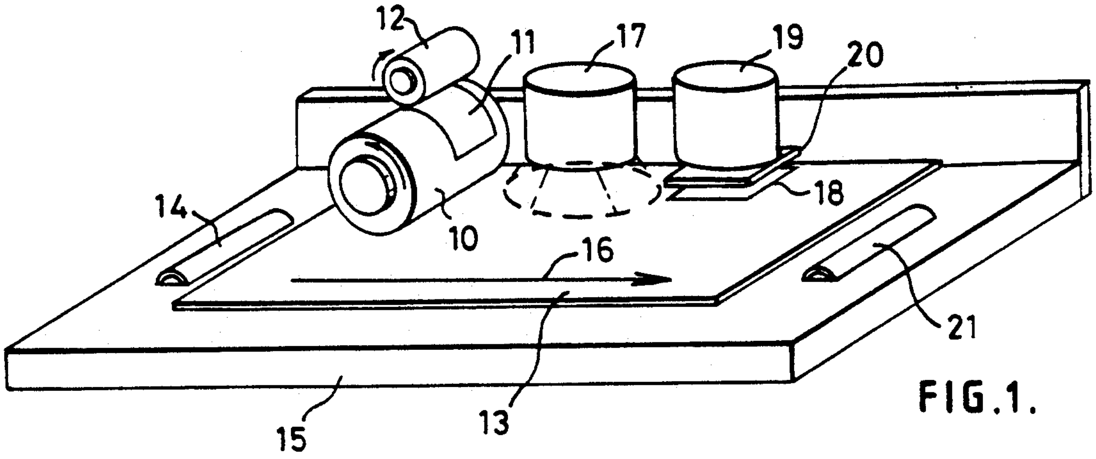
FIG. 1 illustrates a printing device of a franking machine in which information is formed optically in a franking impression.

Referring to FIG. 1, the printing device of a franking machine comprises a print roller 10 carrying a die 11. The die 11 is inked by ink deposited from an ink roller 12 during rotation of the print roller 10. A mail item 13 is fed by means of a driven input feed roller 14 along a feed bed 15 below the print roller 10 in the direction of arrow 16. An impression roller (not shown) is mounted in the feed bed and is raised when a mail item is present to urge the face of the mail item into engagement with the die carried by the print roller. Accordingly as the mail item is fed, in the direction of arrow 16 and in rolling engagement with the die 11, ink transferred to the die from the inking roller is deposited onto the face of the mail item. The optically sensitive material of the ink carried by the ink roller 12 and transferred to the mail item is in a first one of its two states. It will be appreciated that the ink is deposited on the mail item in an area determined by the form of the die 11. If desired the area may be merely of a geometrical shape, for example a rectangle, un-representative of any information or the die may be formed to print a part of the area, or further areas, in the form of a required pattern together with information which is not variable. As the mail item continues to be fed along the feed bed, the area of deposited ink passes below an activating first light source 17 and the entire area of deposited ink is illuminated by the light source 17. The light source 17 emits light of a wavelength and of an intensity effective to switch the printed area of ink from the first state, in which it has been deposited on the mail item, to a second state visually distinct from the first state. Further feeding of the mail item along the feed bed brings the area of deposited ink, indicated by reference 18 under a de-activating second light source 19. The second light source 19 emits light of a wavelength and of an intensity effective to switch ink in the printed area back from the second state to the first state. Light from the second light source 19 passes through a selectively operated shutter 20 which controls exposure of the area to the light from the second source. A convenient form of shutter 20 is provided by means of a liquid crystal device which is generally transparent to light from the source 19 but in which elements thereof can be made opaque selectively whereby the opaque elements obstruct light from the source 19 and prevent exposure of portions of the inked area corresponding to the opaque elements of the shutter 20. The elements of the liquid crystal device are arranged in one or more arrays, for example seven element arrays, so that by selecting appropriate elements of the array, or arrays, opaque areas in the form of digital characters can be formed. Accordingly, exposure of the printed area 18 to light from the source 19 through the shutter 20 is effective to switch most of the area back to its initial first state in which it was deposited on the mail item but portions of the area which are not exposed due to the action of opaque elements of the shutter remain in the second state to which the ink area was switched by exposure to the first light source 17. As a result the inked area comprises a portion or portions corresponding in shape to the opaque elements of the shutter in the second state and representing digital characters while the remainder of the inked area which is subjected to exposure to light from source 19 is switched back to its initial first state. If the die 11 merely effects printing of an area of ink in a geometrical shape such as a rectangle, the shutter 20 is provided, in addition to the selectively opaque elements, with further opaque elements in the form of an invariable pattern and information required for a franking impression. Thus formation of the invariable part of the franking impression on the mail item is effected by the further elements while the selectively opaque elements are utilised to form variable data in the impression. Such variable data would comprise the postage value and data. Usually a franking impression includes a license number or other identification of the franking machine applying the franking impression to the mail item. This identification may be formed by the further elements of the shutter or may be formed by the selectively opaque elements. If an array of elements is provided for each decade, all the characters of the variable information are formed at the same instant by a single energisation of the light source 19. However if desired a single array of elements may be provided and the characters formed sequentially by successive energisations of the light source as area 18 on the mail item id fed past the shutter 20. The feeding of the mail item and timing of energisations of the light source provide the required spacing of the characters.

Instead of the die printing an area of ink which is not representative of information, the die may be formed to print the invariable portions of the franking impression together with an area in which variable information can be formed by subsequent exposure to light from the source 19. With this arrangement the printed impression of the invariable part of the franking impression is protected from exposure to the light from source 19 and only the area for variable information is exposed to light from the source 19.

The mail item is fed away from the franking impression printing device by means of an output feed roller 21. It will be appreciated that pressure rollers co-operating with the input and output feed rollers would be provided to ensure positive feeding of the mail item. For clarity in the drawing, these pressure rollers are not illustrated.

The optically sensitive material in its first state is preferably relatively invisible and may be substantially translucent. When activated to its second state due to exposure to light from the first source 17, the material has a visible colour, for example red. One example of optically sensitive material is switched from the first invisible state to the second visible state by means of exposure to light in the ultra violet region of the spectrum. When utilising certain currently available liquid crystal devices as a shutter for selectively controlling exposure of the material it has been found that the construction of the liquid crystal devices inhibits the passage of light in the ultra violet region. However light of the wavelength required to switch the material from the second visible state to the first invisible state is able to pass through the liquid crystal device in its normal state but is inhibited by elements of the device which have been made opaque. Accordingly where it is desired to use these liquid crystal devices as shutters the arrangement described hereinbefore whereby the material is first switched overall into the second state and then switched selectively back to the first invisible state has been devised. However if light having a wavelength to switch the optically sensitive material from an invisible state to an activated visible state is able to pass through liquid crystal shutter devices exposure of the material to light from the first activating light source may be controlled selectively by a liquid crystal device acting as a shutter and as a result the second light source would not be required. For example if liquid crystal devices able to pass light in the ultra violet region are used the optically sensitive material may be switched selectively by exposure to an ultra violet source through liquid crystal shutter devices.

While the arrangement described hereinbefore enables the formation of a franking impression on a mail item which includes variable information and is reasonably secure against fraudulent alteration of the characters due to the need to expose the optically sensitive material to light of predetermined wavelengths, the use of separately selectable elements to synthesise the required characters suffers from a disadvantage in that this particular method of defining characters does not prevent fraudulent changing of a character, for example from a low value digit to a higher value digit by addition and/or removal of one or more elements of the character by appropriate exposure of the material to light of the required wavelength. Other methods of defining the characters may be utilised when there is a need to provide greater security. In these methods each of the required characters is predefined and preferably the characters have forms which prevent or at least impede attempts to change one character to the form of another character. The predefined characters are selected in accordance with the information to be formed in the franking impression.

Figure 2:
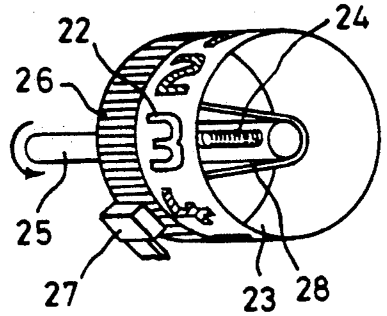
FIG. 2 illustrates a selectively operable optical shutter.

One form of light source and shutter for defining characters is illustrated in FIG. 2 to which reference is now made. The character forms are defined by a mask or stencil in which optically transparent regions 22 in the form of a set of characters are provided on the cylindrical wall 23 of a drum. A light source 24 is mounted within the drum and the drum is rotated about a shaft 25. An encoder track 26 is rotated with the drum and sensed by a sensor 27 to provide signals indicative of the rotational position of the drum. The drum is rotated continuously and at the instant that the required character stencil 22 is aligned in an operative character forming position adjacent the inked area of the face of the mail item as indicated by signals from the sensor 27, the light source 24 is momentarily energised to generate a flash of light to which the inked area is exposed. A reflective light shield 28 is provided to direct the light in a direction toward the mail item and to prevent substantial egress of light through character defining regions which are not aligned with the mail item. It is preferred to use this form of character defining element to selectively expose the inked area to an activating light source to switch the material to its visible state. However if desired it may be used to switch the material back to its initial state in which case the characters would be formed as invisible portions within a visible background. Alternatively, wall 23 of the drum may be optically transparent with the characters formed as optically opaque regions. With this arrangement, the shutter may be used to control exposure to the activating light source to form characters as invisible regions in a visible background or to control exposure to the deactivating light source to form coloured characters.

With a single ring of character defining regions on the wall of the drum only one character is formed at an instant. If desired characters of different decades may be formed sequentially by repetitively energising the light in a series of decade forming cycles at instants in each cycle at which the required character form is aligned adjacent the mail item, the feeding of the mail item causing the characters formed in the series of cycles to be printed side by side. Alternatively a plurality of character defining rings may be provided on the drum, one for each decade respectively. Separate light sources are provided for each ring shields being provided to ensure that for each ring of character defining regions only light from the source associated with the respective ring is able to be transmitted by that ring. The separate light sources are energized selectively at time instants corresponding to the required digit defining regions for each decade being aligned with the mail item. As described with reference to FIG. 1, the fixed pattern and information may be printed by the die 11 or the printed area of ink may be exposed to an activating light source through a pattern and fixed information defining mask with the area intended to receive variable information being masked from exposure. The fixed pattern may be sensed optically to determine the position at which the variable information is to be formed on the inked area. The sensor could comprise an LED light source and light reflected from the printed pattern passes through a filter to a sensing device to generate a signal indicating the position of the printed pattern relative to the variable character forming device.

Figure 4:
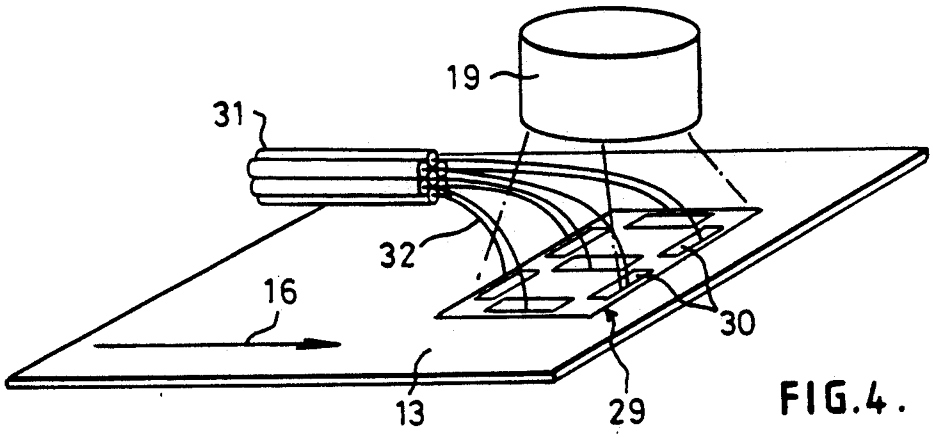
FIG. 4 illustrates another form of selectively operable optical shutter.

FIG. 4 shows a shutter construction which effects formation of the required characters in the area of sensitive material in a manner similar to the liquid crystal shutter of FIG. 1. However instead of having elements which are made opaque by the application of electrical voltage, the shutter of FIG. 4 is operated electromechanically. The shutter 29 comprises a plurality of shutter elements 30 which can be moved between positions in which passage of light is inhibited and passage of light is permitted. The mail item 13 is fed below the shutter 29 and the area of sensitive material is exposed to light from a source 19 through the shutter 29. The elements of the shutter are moved by operation of solenoids 31 acting through mechanical connections which may be flexible wires 32. A single shutter, as shown, may be provided and characters formed by repeated energisation of the light source as the mail item is fed or a plurality of shutters may be provided to enable formation of all the characters to be formed at the same instant.

Instead of utilising a light source capable of exposing the entire area of sensitive material and controlling exposure by means of a selectively operated shutter arrangement, the light source may be formed to provide the required illumination to define the required characters. One arrangement comprises an array of light emitting diodes arranged in an array whereby selective energisation of the diodes provides a light emission in the form of the required character. Accordingly the area of sensitive material would be exposed directly to the light emitted by the selected energised diodes. The characters may be formed serially using a single array of diodes or may be formed at the same time by a plurality of arrays of diodes. Another arrangement comprises a row of light emitting diodes arranged in line in the direction of feed of the mail item. Each of the diodes is formed or masked to emit light having the formation of a different one of a set of characters. As the mail item is fed the diodes are energised selectively at instants of time such that required characters are formed in required positions in the franking impression.

Figure 3:
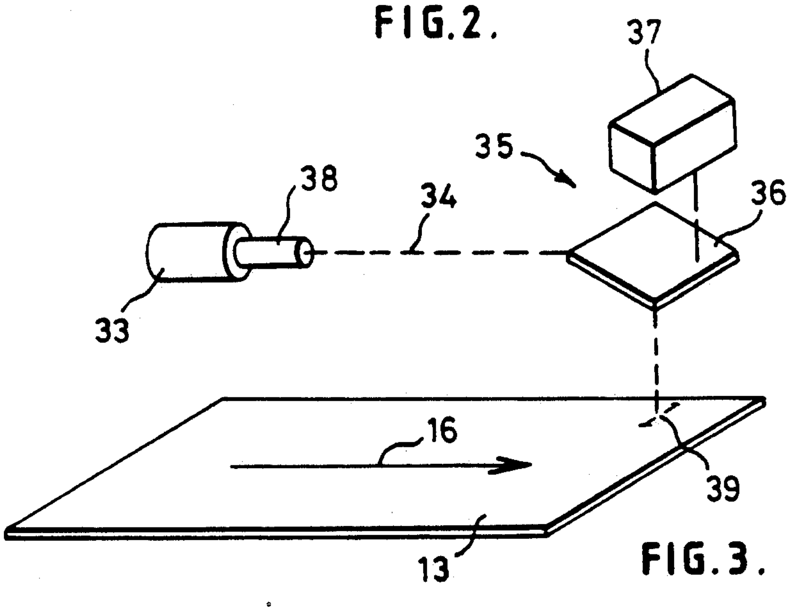
FIG. 3 illustrates use of a scanned light beam for printing.

A further method of exposing the sensitive material to light is to use a single light source producing a narrow beam of light which is scanned over the area of sensitive material as illustrated in FIG. 3. A laser light source 33 and collimator 38 generates a high intensity narrow parallel light beam 34 directed onto a deflection system 35. The deflection system 35 comprises a light deflecting mirror 36 or the like to deflect the beam onto the face of the mail item 13 and an electrically driven actuator 37 to move the mirror 36 to cause the light beam to be scanned as indicated at 39 in a direction transverse to the direction 16 of feed of the mail item. Feeding of the mail item causes the light beam to progressively scan across the area of the sensitive material. Energisation of the light source is controlled such that during scanning of the area of material regions having the form of required characters are exposed to the light.

Hereinbefore it has been assumed that the optically sensitive material is substantially translucent and invisible in its initial state and assumes a visible coloured state when switched, by exposure to light of the required wavelength and intensity, to the other state. However if desired the optically sensitive material may be mixed with a conventional coloured ink. When the optically sensitive material is in its translucent state, the mixture would be of the colour determined by the conventional ink. Switching of the optically sensitive material to its coloured state causes the mixture to change colour so that the mixture can be caused to assume a colour dependent upon the state of the optically sensitive material. If desired the area of sensitive material printed onto the surface of a mail item as hereinbefore described may comprise such a mixture in which case instead of the characters being coloured on an invisible background, or invisible in a visible background, the characters may be of one colour on a background of a different contrasting colour.

Figure 5:
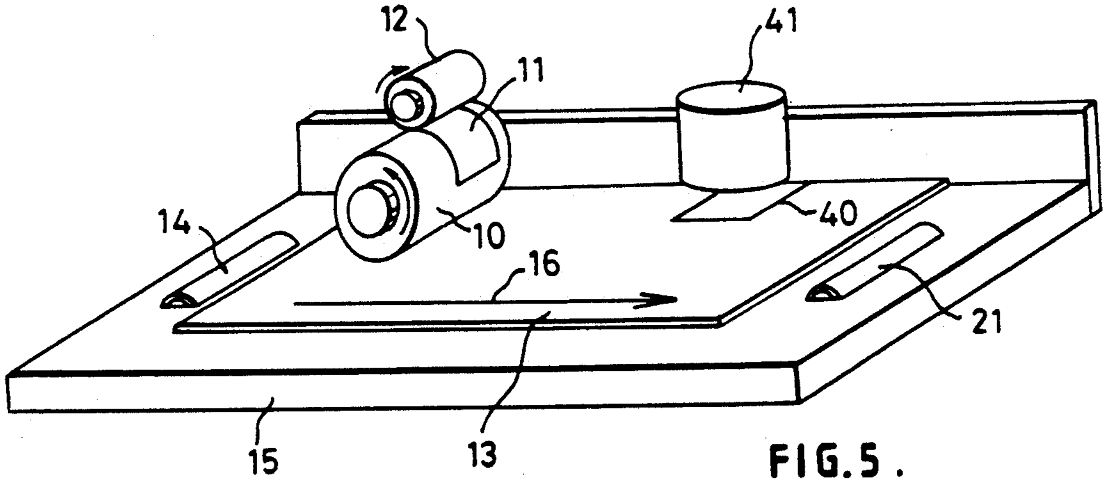
FIG. 5 illustrates a printing device for printing a distinguishing mark on mail items.

As shown in FIG. 5, the optically sensitive material may be utilised to provide a marking 40 on mail items indicative of the class of mail. The franking machine may be arranged in its normal state to print first class mail impressions in a first colour and in response to a command to print a second class mail impression, the material printed onto the mail item would be subjected to exposure to light from a source 41 of a wavelength and intensity such as to cause the sensitive material to change state and thereby provide a second class mail impression. For example by using a mixture as described hereinbefore first class impressions would have a first colour and second class impressions would be in a second contrasting colour. The difference in colour of the impressions could be used in sorting mail into first and second class. Where the franking machine is arranged to print a slogan alongside the franking impression, the mixture deposited on the mail item may be exposed to light of required wavelength and intensity to switch the sensitive material to a state such that the slogan has a colour different from that of the franking impression.

The characters formed in the franking impression may be uniformly of a single colour or uniformly uncoloured. If desired, very small areas within the characters may be of contrasting colour to provide security information relating to the franking. These very small areas would be substantially undetectable to normal inspection by eye but could be monitored by suitable equipment. These security information areas may be formed by exposure, or protection from exposure, by modification of the arrangements for selective exposure as described hereinbefore.

The optically sensitive material is fast acting and can be switched by exposure of very short duration. This enables data to be recorded in the franking impression at the same time as the characters of the franking impression are formed. Data relating to the franking impression, for example the value of the franking, may, in addition to being formed as visually readable characters, be formed in the area of deposited material as a machine readable code such as a bar code. The bar code may be formed by selective energisation of a narrow bar shaped light source extending transversely to the direction of feeding of the mail item, the light source being energised to emit flashes having a duration and timing such as to cause a series of bar shaped regions of the area to be switched. Alternatively the machine readable code may be in the form of a series of individual dots representing binary digits, a dot representing one binary value and the absence of a dot representing the other binary value. An area of the franking impression may be reserved to receive data, such as accounting data or data relating to the franking impression, for example the value of the franking. This data may be recorded in machine readable code as described hereinbefore in relation to forming the value of franking. Instead of forming the accounting data in the franking impression on the mail item, the data may be printed on a record member such as a tally roll positioned adjacent the mail item. Ink deposition means would be provided for both the mail item and the tally roll. If a print roll is used, the print roll would have dies for printing on both the mail item and thet tally roll or separate print rollers with dies may be provided. A selectively energised light source would be provided for writing data on the tally roll.

If desired information relating to security of the franking machine may be formed in or adjacent to the franking impression to provide an indication in the event of tampering with the franking machine. Information may be written as a secure code. Validation of a franking impression could be provided by a simple mark adjacent the franking impression. This mark may be printed on the mail item in an invisible state and remain in this state after issuing of the mail item from the franking machine. Presence of the mark and any information incorporated therein could then be checked by the Postal Authority by switching the mark by exposure. The mark may then be switched back to its invisible state before delivery of the mail item to its destination. In this way the existence of the mark would not be evident to the general public. The die 11 utilised for printing an area of material which is to be subsequently selectively switched to a visible state may be formed to print information which is protected from exposure and hence not switched during exposure of other parts of the area to form a representation of the postage charge. Accordingly this information remains invisible until exposure and switching by the Postal Authority.

Where ink is deposited in a substantially translucent invisible state, the franking machine may be provided with means to expose the material to switch it to a visible state to enable detection of the presence of the material and with means to expose the material to switch it back to its translucent state. The detection means may provide an indication if the supply of ink is deficient.

It will be appreciated that instead of depositing the optically sensitive material on the mail item when in a translucent or non-visible state, the material may be deposited when in a visible coloured state and a region or regions thereof may be switched to a translucent or non-visible state by selective exposure.

Figure 6:
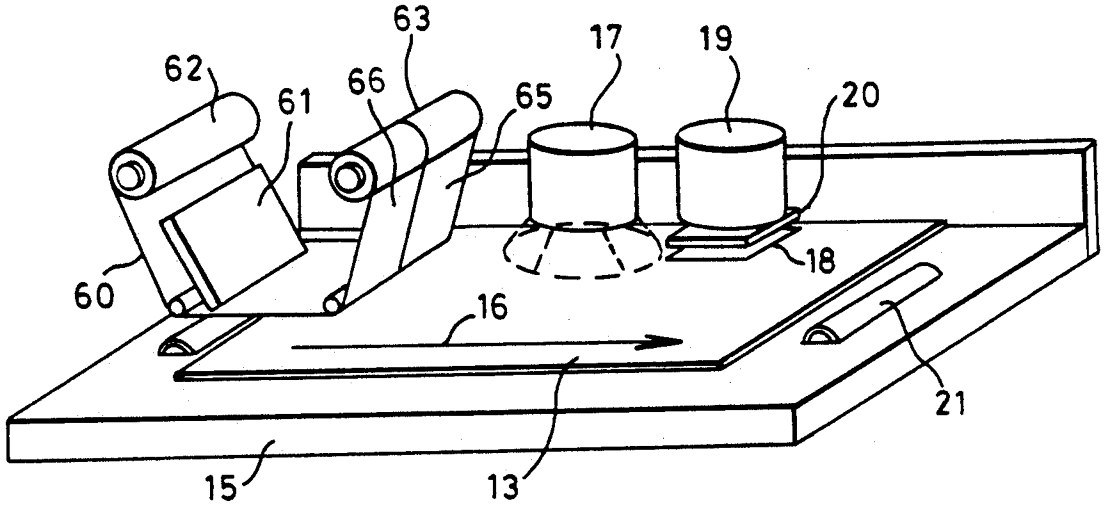
FIG. 6 illustrates a printing device utilising a thermal print head.
Figure 7:
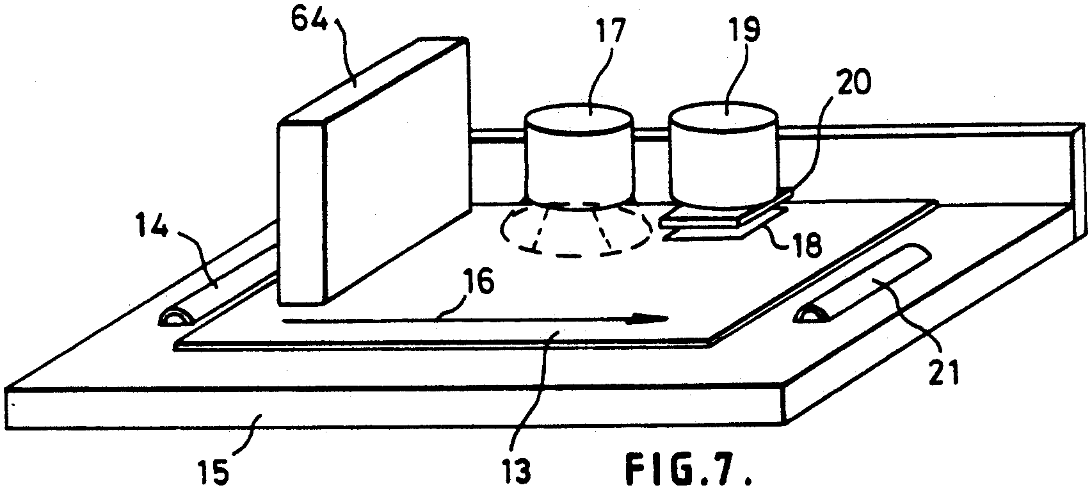
FIG. 7 illustrates a printing device utilising an ink jet print head.

While the optically sensitive material may be deposited by a die 11 carried by a rotatable printing drum 10 as described hereinbefore with reference to FIG. 1, other methods of deposition may be utilised. As illustrated in FIG. 6 the material, or ink containing the material may be carried on a thermal transfer ribbon 60 and be transferred to the main item by heating of a thermal print head 61. The ribbon is supplied from a spool 62 and is fed together with the mail item 13 past the thermal print head 61. The used ribbon is wound onto a take up spool 63. Instead of contact printing to deposit the material, non-contact methods may be used. For example, as illustrated in FIG. 7, the material may be ejected onto the main item 13 by means of an ink jet printing device 64. When using any of these different devices for depositing the material, it is to be understood that the material may be deposited in the form of a geometrical shape, in the form of information or a combination of geometrical shape and information. Furthermore in addition to the deposition of the optically sensitive material, a pattern or information may be printed with conventional ink. This may be accomplished by the provision of a supply of conventional ink together with a supply of ink consisting of or containing the optically sensitive material. For example, if the ink is carried on a thermal transfer ribbon 60, the optically sensitive ink may be confined to a narrow band or bands 65 extending along the ribbon with the remainder of the width 66 of the ribbon carrying conventional ink.

Other optically sensitive materials are available which have two stable optical states and can be switched by exposure to light of predetermined wavelength from a first state to a second state but which cannot be switched from the second state to the first state. If desired materials having this property may be used instead of the reversible materials but it will be appreciated that the double switching as described hereinbefore with reference to FIG. 1 would not be used with such materials.

Figure 8:
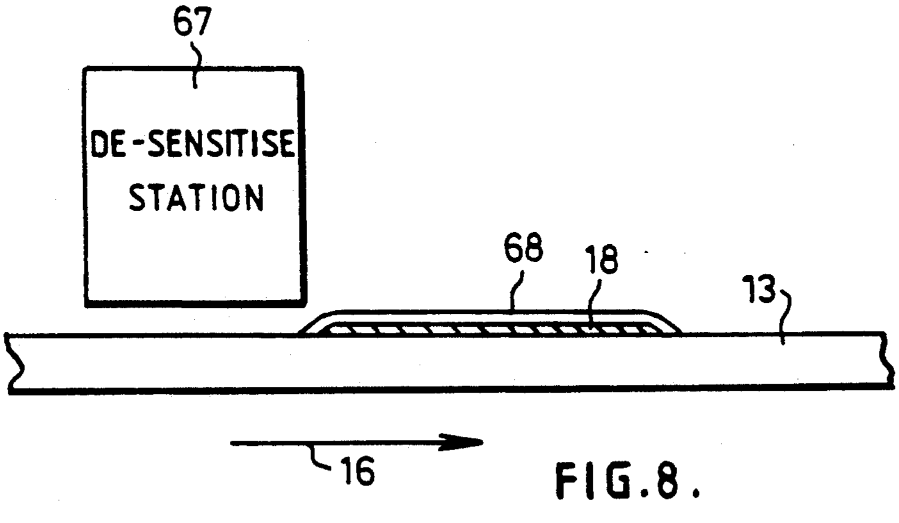
FIG. 8 illustrates means to treat an area of material to make it insensitive to light capable of switching the material.

It will be appreciated that the optically sensitive material can be switched only by subjecting it to light of a predetermined wavelength. This characteristic is useful in providing a degree of protection from fraudulent attempts to modify the franking impression subsequent to the impression being formed on the mail item because any attempt to modify the impression would require the possession of a light source capable of emitting light of the required wavelength. However in some instances it may be desired to provide additional protection to prevent modification of the franking impression. This may be accomplished by passing the area of optically sensitive material 18, after formation of the franking impression thereon, through a station 67 (FIG. 8) at which the area is treated to desensitise it to light of the wavelength required to switch it. For example, if the franking value is represented by regions of material which have been switched to a visible state and it is desired to prevent switching of additional regions which would cause the franking impression to represent a higher value of franking, the area 18 of optically sensitive material would be treated to make it insensitive to light of the wavelength required to switch the material to the visible state. One proposed method of treating the area of optically sensitive material is to cover the area 18 with a layer 68 of a substance which has a high opacity to light of that required wavelength. Thus light of the required wavelength for switching the material would be prevented from reaching the optically sensitive material or sufficiently attenuated as to be ineffective to switch the material.

Figure 9:
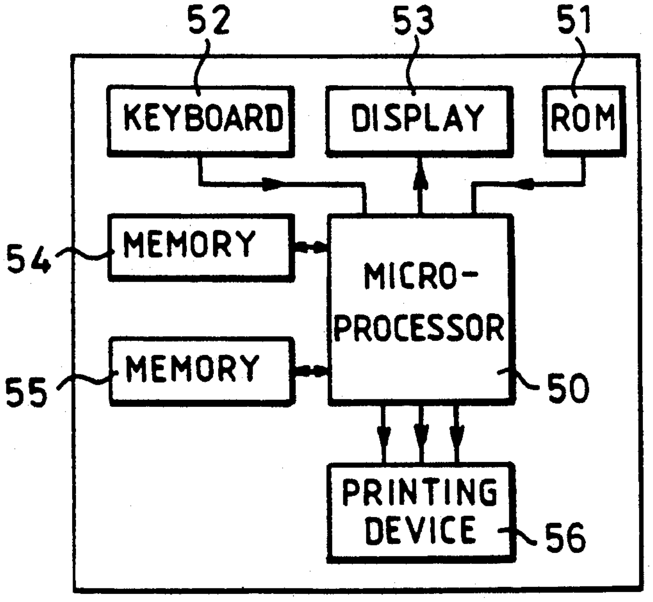
FIG. 9 is a block diagram of the electronic circuits of the franking machine for controlling the printing device.

Referring now to FIG. 9, the franking machine in which a printing device as described hereinbefore is utilised to form franking impressions on mail items includes a microprocessor 50 operating under control of program routines stored in a read only memory (ROM) 51. A keyboard 52 is provided for the input of command signals to the microprocessor and of postage values with which the mail items are to be franked. A display 53 displays information to a user of the franking machine to assist the user in operating the machine. Non-volatile memories 54 and 55 are provided for the storage of postage accounting data. Each memory 54, 55 includes a descending register for storing a value of credit available for use in franking of mail items, an ascending register for storing an accumulated value of postage used, an items count of the number of mail items franked and a high items count of the number of mail items franked with a value exceeding a predetermined value. Each register is duplicated in each memory 54 and 55. Replication of each register in this manner enables integrity of the accounting data to be maintained in the event of a fault arising in the memory devices.

The microprocessor outputs control and print signals to the printing device 56, comprising any one of the devices described hereinbefore with reference to FIGS. 1 to 5, to control the feeding means for the mail item, to control a drive for rotation of the drum 10 to deposit ink on the mail items and to operate the means for selectively exposing the ink deposited on the mail item to form the franking impression including a required postage value or other security marking on a mail item. Where the ink is deposited on the mail item by thermal transfer or ink jet print heads, the signals output by the microprocessor include signals to operate the thermal print head or ink jet print head to deposit an area of ink as required.

We claim:

1. A franking machine including means to deposit an area of material on a face of a mail item, said material being switchable from a first optically stable state to a second optically stable state by exposure to light of predetermined wavelength and said deposited material being in said first state; and selectively operable first exposure means to expose at least one selected region of the area of material in said first state to light of said first predetermined wavelength to switch the selected region or regions to the second state to represent information and wherein said material is switchable from said first optically stable state to said second optically stable state by exposure to light of first wavelength and is switchable from said second optically stable state to said first optically stable state by exposure to light of a second wavelength different from said first wavelength.

2. A franking machine as claimed in claim 1 wherein the first exposure means includes a first source to emit light having the first predetermined wavelength and selectively operable shutter means.

3. A franking machine as claimed in claim 2 wherein the selectively operable shutter means includes a liquid crystal device interposed between the light source and the mail item and effective to define a region or regions of the area of deposited material exposed to light from the first source.

4. A franking machine as claimed in claim 2 wherein the selectively operable shutter means includes a plurality of shutter elements movable between light inhibiting positions and light transmitting positions.

5. A franking machine as claimed in claim 4 including electro-mechanical actuators mechanically coupled to the shutter elements and selectively electrically operable to move the shutter elements.

6. A franking machine as claimed in claim 1 wherein the first exposure means includes a first light source to emit light having the first predetermined wavelength; optical mask means movable to bring each of a group of character defining forms into an operative position between the first light source and the mail item; and means operable to energise the first light source when a character defining form corresponding to a required character is in the operative position so as to expose a region of the area having the form of the required character to light from the first source.

7. A franking machine as claimed in claim 6 wherein the optical mask is continuously rotated to bring the character defining forms serially into the operative position.

8. A franking machine as claimed in claim 1 wherein the first exposure means includes a light source to generate a narrow collimated beam of light having the first predetermined wavelength; and deflection means operable to deflect the light beam to expose a selected region or regions of the area.

9. A franking machine as claimed in claim 8 wherein the deflection means scans the light beam across the area and the light source is energised selectively to define one or more information representing regions in the area of material.

10. A franking machine as claimed in claim 1 wherein the means to deposit an area of material on a face of a mail item is operable to deposit the optically sensitive material in further areas forming a fixed or invariable pattern.

11. A franking machine as claimed in claim 10 wherein the means to deposit an area of material is operable to deposit the material in the invariable pattern including a representation of invariable information.

12. A franking machine as claimed in claim 1 wherein the selectively operable first exposure means is operable to switch the selected region to the second state to represent a postage value of a franking impression.

13. A franking machine as claimed in claim 1 wherein the selectively operable first exposure means is operable to switch the selected region to the second state to represent a mark indicative of security of the franking machine.

14. A franking machine as claimed in claim 1 wherein the area of material deposited on the mail item when in the first state indicates one class of mail service and the selectively operable first exposure means is operable to switch the area to the second state to indicate another class of mail service.

15. A franking machine as claimed in claim 1 wherein the means for depositing the optically sensitive material on the mail item comprises a die carried on a rotatable print drum.

16. A franking machine as claimed in claim 1 wherein the means for depositing the optically sensitive material on the mail item comprises a thermal print head effective to transfer the optically sensitive material from a thermal transfer ribbon to the mail item.

17. A franking machine as claimed in claim 1 wherein the means for depositing the optically sensitive material on the mail item comprises a non-contact printing means.

18. A franking machine as claimed in claim 17 wherein the means for depositing the material includes an ink jet printing head.

19. A franking machine as claimed in claim 1 including means to record data within the selectively switched region as sub-regions within the region, said sub regions being optically differentiated from the remainder of the region.

20. A franking machine as claimed in claim 1 including means to feed the mail item to carry the area past the first exposure means and wherein a plurality of adjacent characters is formed by character defining exposures timed in dependence upon passage of the area past the first exposure means.

21. A franking machine as claimed in claim 1 and including means to print data relating to usage of the machine in franking operations on a record member.

22. A franking machine as claimed in claim 1 wherein the selectively operable first exposure means is operable to switch regions of the material to the second optically stable state to represent a machine readable code.

23. A franking machine as claimed in claim 22 wherein the machine readable code is a bar code.

24. A franking machine including means to deposit an area of material on a face of a mail item, said material being switchable from a first optically stable state to a second optically stable state by exposure to light of predetermined wavelength and said deposited material being in said first state; selectively operable first exposure means to expose at least one selected region of the area of material in said first state to light of said first predetermined wavelength to switch the selected region or regions to the second state to represent information and means to treat said area of material to prevent subsequent switching of said material.

25. A franking machine as claimed in claim 24 wherein the means to treat the area of material includes means to deposit a layer over the area, said layer having a high opacity to light having a wavelength effective to switch the material.

26. A franking machine including means to deposit an area of material on a face of a mail item, said material being in a first optically stable state and being switchable from said first optically stable state to a second optically stable state by exposure to light of first predetermined wavelength and being switchable from said second optically stable state to said first optically stable state by exposure to light of second predetermined wavelength different from said first predetermined wavelength and including first exposure means to expose said deposited material to light of said first predetermined wavelength to switch the material to said second optically stable state and selectively operable second exposure means to expose a selected region of said material in said second optically stable state light of said second predetermined wavelength to switch said region of material from said second optically stable state to said first optically stable state.

27. A franking machine including a material having first and second stable optically differentiated states and being switchable from said first stable state to said second stable state solely by exposure to light of at least first predetermined intensity and of first predetermined wavelength and from said second stable state to said first stable state solely by exposure to light of at least second predetermined intensity and of second predetermined wavelength different from said first predetermined wavelength; means to deposit said material on a face of a mail item; and selectively operable first exposure means to expose a selected region of said deposited material when in said first state to light of at least said first predetermined intensity and of said first predetermined wavelength to switch said selected region of said material from said first state to said second state to represent postal information.

28. A method of forming a franking impression on a mail item comprising the steps of depositing an area of material on a face of the mail item, said material having first and second stable optically differentiated states and being switchable from said first stable state to said second stable state solely by exposure to light of at least first predetermined intensity and of first predetermined wavelength and from said second stable state to said first state solely by exposure to light of at least second predetermined intensity and of second predetermined wavelength different from said first predetermined wavelength; and selectively exposing at least one selected region of said area of said material when in said first state to light of at least said first predetermined intensity and of said first predetermined wavelength to switch said selected region from said first state to said second state to form at least a part of the franking impression.

29. A method of forming a franking impression on a mail item comprising the steps of depositing an area of material on a face of a mail item, said material being switchable from a first stable optical state to a second stable optical state by exposure to light of predetermined first wavelength and being switchable from said second stable optical state to said first stable optical state by exposure to light of predetermined second wavelength different from said predetermined first wavelength and said deposited area of material being in said first state; and selectively exposing at least one selected region of said deposited area of material in said first optically stable state to light of first predetermined wavelength to switch said at least one selected region to said second optically stable state to represent information wherein the material is switchable from the first state to the second state by exposure to light of first wavelength and is switchable from the second state to the first state by exposure to light of second wavelength.

* * * * *

UNITED STATES PATENT AND TRADEMARK OFFICE

CERTIFICATE OF CORRECTION

PATENT NO. : 5,302,825

DATED : April 12, 1994

INVENTOR(S) : ABUMEHDI

It is certified that error appears in the above-indentified patent and that said Letters Patent is hereby corrected as shown below:

TITLE PAGE, ITEM [73]:

Please change Assignee from:

"ALCATEL BUSINESS SYSTEMS LIMITED"

to

--NEOPOST LIMITED--.

Signed and Sealed this

Thirteenth Day of September, 1994

*Attest:*

BRUCE LEHMAN

*Attesting Officer*

*Commissioner of Patents and Trademarks*